United States Patent
Kaizu (10) Patent No.: US 7,643,369 B2
(45) Date of Patent: Jan. 5, 2010

(54) INFORMATION PROCESSING APPARATUS, MEMORY UNIT ERRONEOUS WRITE PREVENTING METHOD, AND INFORMATION PROCESSING SYSTEM

(75) Inventor: Tetsuya Kaizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 101 days.

(21) Appl. No.: 11/907,394

(22) Filed: Oct. 11, 2007

(65) Prior Publication Data
US 2009/0027991 A1 Jan. 29, 2009

(30) Foreign Application Priority Data
Dec. 28, 2006 (JP) ............................. 2006-355103

(51) Int. Cl.
*G11C 7/00* (2006.01)
(52) U.S. Cl. .................. 365/228; 365/185.02; 365/195
(58) Field of Classification Search ................ 365/228, 365/185.02, 195
See application file for complete search history.

(56) References Cited

U.S. PATENT DOCUMENTS 5,199,032 A * 3/1993 Sparks et al. ............... 714/703
6,552,934 B2 * 4/2003 Roohparvar ........... 365/185.18
7,213,120 B2 * 5/2007 Hotaka ....................... 711/163

FOREIGN PATENT DOCUMENTS

JP 59-206975 11/1984
JP 2001-187252 7/2001

* cited by examiner

Primary Examiner—Connie C Yoha
(74) Attorney, Agent, or Firm—Fujitsu Patent Center (57) ABSTRACT

To make it possible to reliably halt writing processing while restraining erroneous writing to the memory unit, present apparatus has a memory unit to which data is written for each write request; a voltage converting unit which converts a first power source voltage into a first operable voltage with which a write request issuing unit is operable, and supplies the first operable voltage to the write request issuing unit; a voltage monitoring unit, which outputs an issuance restraining signal which restrains issuance of the write request, when the first power source voltage becomes lower than a reference voltage; and an issuance restrain controlling unit which receives the issuance restrain signal, and then after completion of writing for each of the write request to write memory unit, which restrains the issuance of the write request by the write request issuance unit.

21 Claims, 7 Drawing Sheets

INFORMATION PROCESSING APPARATUS, MEMORY UNIT ERRONEOUS WRITE PREVENTING METHOD, AND INFORMATION PROCESSING SYSTEM

BACKGROUND OF THE INVENTION

1) Field of the Invention

The present invention relates to technology for halting an information processing apparatus when a power source voltage supplied to the information processing apparatus which performs data write processing to a memory unit is lowered.

2) Description of the Related Art

Previously, an information processing apparatus which performs data writing to a memory forcibly resets a CPU (Central Processing Unit) or the like which performs data write processing when a power source voltage is lowered.

Figure 5:
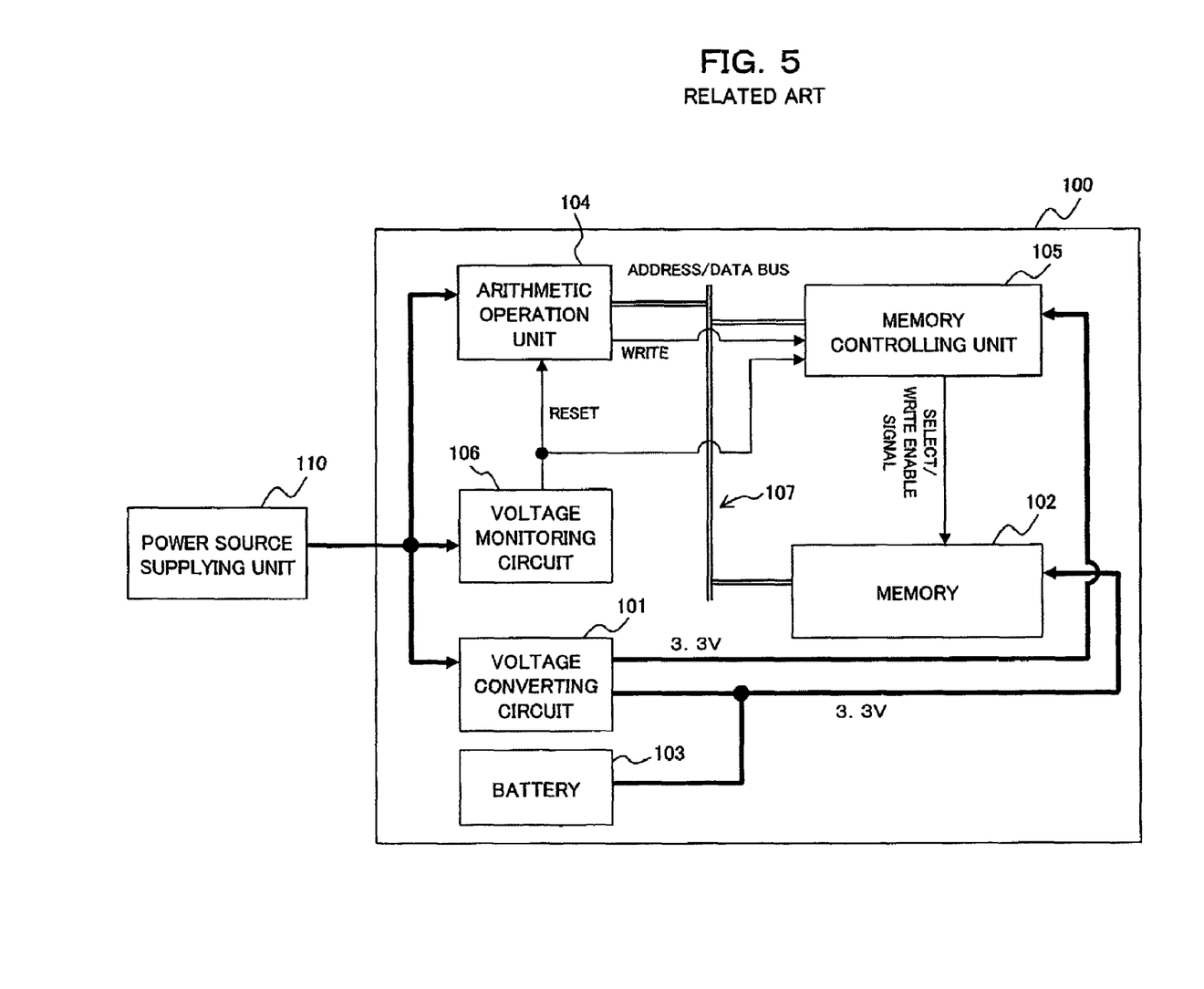
FIG. 5 is a block diagram showing a construction of a previous information processing apparatus.

FIG. 5 shows a previous information processing apparatus 100. The information processing apparatus 100 has a voltage converting circuit 101, a memory 102, a battery 103, an arithmetic operation unit (for example, a CPU) 104, a memory controlling unit 105, and a voltage monitoring unit 106.

The voltage converting circuit 101 is a circuit which converts a power source voltage supplied from an external power source supplying unit 110 into a voltage used inside. Here, the voltage converting circuit 101 converts the power source voltage into an operable voltage for the memory 102, and supplies to the operable voltage to the memory 102.

Concretely, the voltage converting circuit 101 converts a power source voltage of 5.0 V, for example, from the external power source supplying unit 110 into 3.3 V, for example, and supplies the converted voltage to the memory 102. Further, the voltage converting circuit 101 converts a power source voltage of 5.0 V, for example, from the external power source supplying unit 110 into 3.3 V, for example, and supplies the converted voltage to the memory controlling unit 105.

The memory 102 is supplied with voltage from the voltage converting circuit 101 to hold data therein. The memory 102 holds data by using voltage of the battery 103, when power source supply from the external power source is lowered. The memory 102 is a memory unit which can perform battery backup.

In this instance, the memory 102 can perform write processing and read processing with a power source voltage of 3.0 V through 3.6 V. For example, the memory 102 can hold data with a power source voltage of 2.2 V through 3.6 V.

Further, the battery 103 is charged by receiving a power source voltage from the voltage converting circuit 101, while the information processing apparatus 100 is activated by the supply of power from the external power source supplying unit 110.

The arithmetic operation unit 104 issues a write request to perform data write processing to the memory 102, and operates with a power source voltage of 5.0 V supplied from an external power source supplying unit 110. In this instance, the arithmetic operation unit 104 is operable with a power source voltage of 4.5 V through 5.5 V.

The memory controlling unit 105 is supplied with voltage from the voltage converting circuit 101, and receives a data write request issued from the information processing apparatus 10, and controls (permits) data writing to the memory 102 based on the write request. In this instance, the memory controlling unit 105 is operable with a power source voltage of 3.0 V through 3.6 V, for example.

As shown in FIG. 5, the memory 102, the arithmetic operation unit 104 and the memory controlling unit 105 are connected via an address/data bus 107. For example, in the information processing apparatus 100, when the memory controlling unit 105 receives a write request (in the drawing, described as "write"), the memory controlling unit 105 sends a chip select signal and a write enable signal (in the drawing, described as "select/write enable signal") to the memory 102. This makes it possible to write data to the memory 102. Data writing to the memory 102 is performed via the address/data bus 107.

Figure 6:
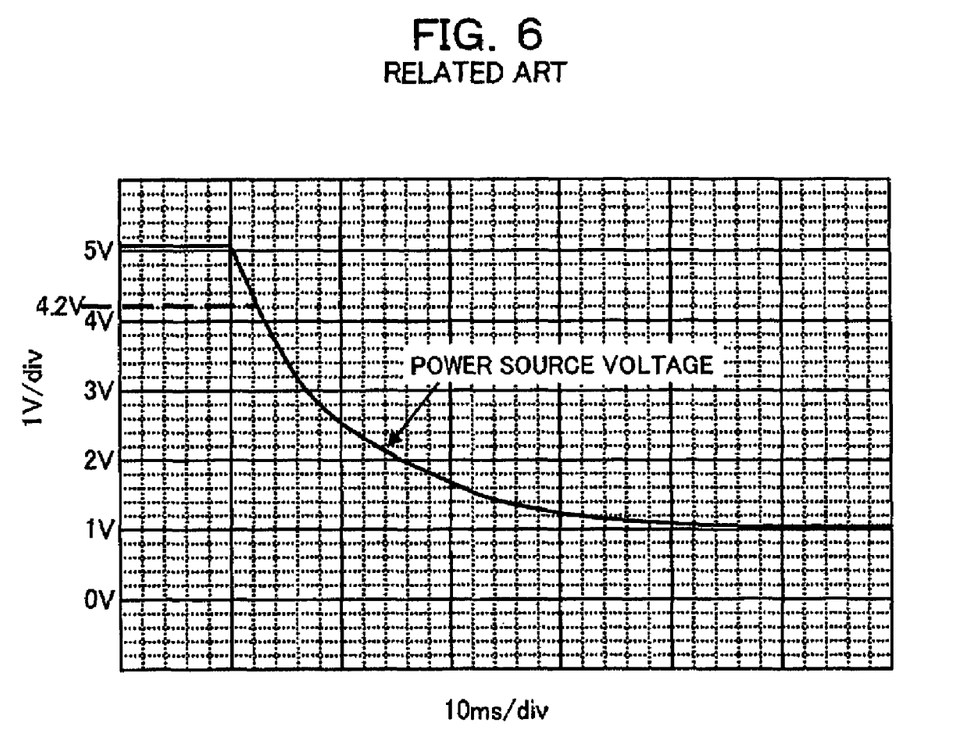
FIG. 6 is a diagram showing an example of lowering of a power source voltage supplied from a power source supplying unit of the previous information processing apparatus.

The voltage monitoring circuit 106 is a circuit which monitors a power source voltage from the external power source supplying unit 110 (herein after, simply called a power source voltage). For example, a reference voltage (here, 4.2V) as a threshold value is input (not illustrated), and by comparing this reference voltage and the power source voltage, the voltage monitoring circuit 106 monitors lowering of the power source voltage. When the power source voltage becomes not higher than the reference voltage as shown in FIG. 6, for example, when a circuit breaker is off, and power failure occurs, the voltage monitoring circuit 106 resets the arithmetic operation unit 104 and the memory controlling unit 105.

Here, "reset" means deleting information which is being processed and held in the arithmetic operation unit 104 and the memory controlling unit 105, and halting the arithmetic operation unit 104 and the memory controlling unit 105.

In this instance, as technology equivalent to the previous art shown in FIG. 5, there is technology in which when the power voltage becomes lower than a predetermined voltage, a NMI (Non-Maskable Interrupt) signal to a CPU, and access to a RAM (Random Access memory) is prohibited to protect data held in the RAM (for example, see the following document 1). In addition, there is technology in which when an input voltage is lowered to a predetermined voltage, a reset signal is given to a micro processor to prohibit generating unjustifiable writing by the microprocessor and deleting to protect the memory (for example, see the following patent document 2).

Here, in the previous information processing apparatus 100 shown in FIG. 5 and the previous arts disclosed in following patent document 1 and 2, when a power source voltage becomes not higher than the reference voltage due to any cause such as power failure, regardless of processing state for the arithmetic operation unit 104 and the memory controlling unit 105, that is, even halfway through a bus cycle as write processing unit relating to a write request issued by the arithmetic operation unit 104, the voltage monitoring circuit 106 still resets the arithmetic operation unit 104 and the memory controlling unit 105, and thus, the arithmetic operation unit 104 and the memory controlling unit 105 is reset in asynchronous with the bus cycle.

That is, in the information processing apparatus 100 in which data is written to the memory 102 for each write request, the arithmetic operation unit 104 and the memory controlling unit 105 are reset halfway through writing of the write request from the arithmetic operation unit 104.

Figure 7A:
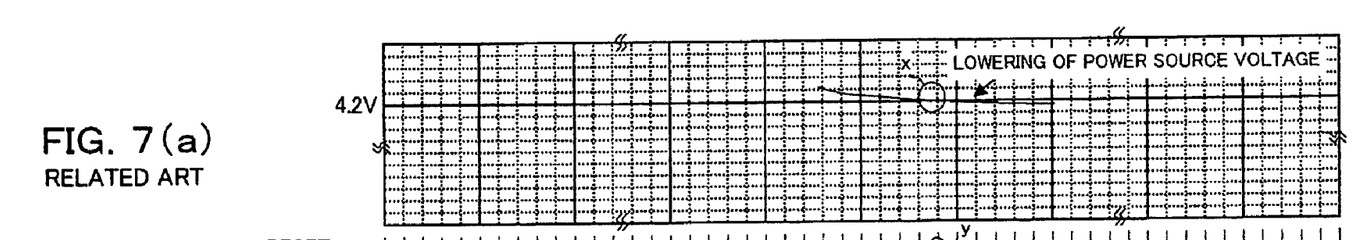
FIG. 7(a) shows lowering of the power source voltage.
Figure 7B:
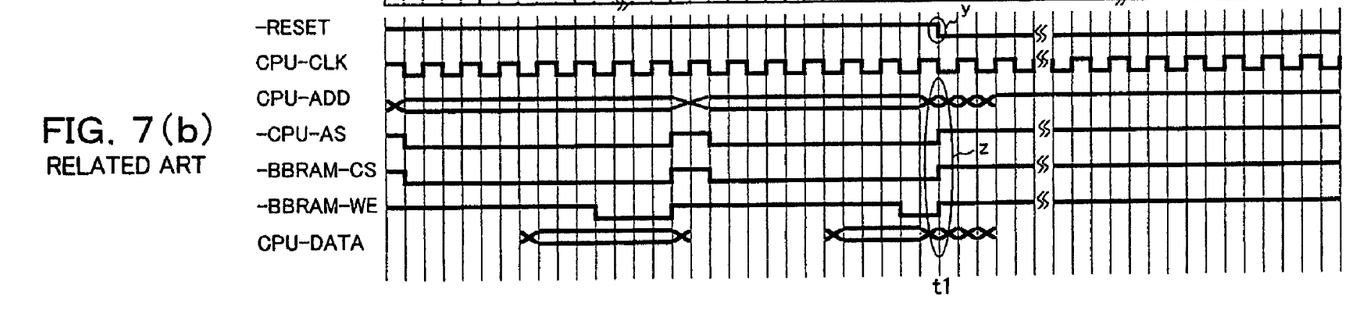

More specifically, as shown in FIG. 7(a), when it is detected that a power source voltage is lowered, and the voltage monitoring circuit 106 detects that the power source voltage becomes not higher than a reference voltage of 4.2 V (see range x indicated by the broken line in the drawing), as shown in FIG. 7(b), a reset signal is asserted (see timing t1; see range y indicated by the broken line in the drawing) to the arithmetic operation unit 104 and the memory controlling unit 105 asynchronously to a bus cycle relating to a write request from the arithmetic operation unit 104.

Here, in FIG. 7(b), "CPU-CLK" indicates a clock signal (for example, 25 MHz) input to the arithmetic operation unit 104; "CPU-ADD" indicates an address in the memory 102 to which data on an address bus is written; "-CPU-AS" indicates an address strove signal which indicates whether or not an address on the address bus is effective; "-BBRAM-CS" indicates a chip select signal output from the memory controlling unit 105 to the memory 102; "-BBRAM-WE" indicates a write enable signal output from the memory controlling unit 105 to the memory 102; "CPU-DATA" indicates data to be written to the memory 102 on the data bus. In this instance, as to the reset signal ("-RESET") signal, the address strove signal ("-CPU-AS"), the chip select signal ("-BBRAM-CS"), and the write enable signal ("BBRAM-WE"), the lower side indicates ON (assert), and the upper side indicates OFF (negate).

Then, when the reset signal is asserted, the arithmetic operation unit 104 and memory controlling unit 105 are reset with that timing (see timing t1 in the drawing). Thus, halfway of a bus cycle (write processing unit for each write request), the address strove signal, the chip select signal, and the write enable signal change to negate, and the address bus and the data bus are also changed (see timing t1 in the drawing; see range z indicated by the broken line in the drawing).

On the other hand, at that time, since the memory 102 is in an operable state, depending on the chip select signal and the write enable signal as changed write controlling signals, and on address information on an address bus and a data state on data bus, unnecessary access to the memory 102 occurs, and thus, erroneous writing to the memory 102 can occur.

In particular, when the information processing apparatus 100 is such that referring to the memory 102 and is activated (boots up) based on the contents, if erroneous writing to the memory 102 occurs at the time of reset due to lowering of the power source voltage, it would happen that the next booting of the information processing apparatus 100 is impossible, and if the information processing apparatus 100 boots up, it can boot up in an erroneous state.

[Patent Document 1] Japanese Patent Application laid-open No. 2001-187252

[Patent Document 2] Japanese Patent Application laid-open No. SHO 59-206975

SUMMARY OF THE INVENTION

With the foregoing problems in view, it is an object of the present invention to make it possible to reliably halt write processing to the memory unit while restraining erroneous writing to the memory unit when a power source voltage is lowered.

In order to accomplish the above object, according to the present invention, there is provided an information processing apparatus, comprising: a memory unit to which data is written for each write request; a write request issuing unit which issues the write request; a voltage converting unit which converts a first power source voltage into a first operable voltage with which the write request issuing unit is operable, and supplies the first operable voltage to the write request issuing unit; a voltage monitoring unit, to which a reference voltage higher than the first operable voltage is input, when the first power source voltage becomes lower than the reference voltage, for outputting an issuance restraining signal which restrains issuance of the write request from the write request issuing unit; and an issuance restrain controlling unit which receives the issuance restrain signal output from the voltage monitoring unit, and then after completion of writing for each of the write request to the memory unit, which restrains the issuance of the write request by the write request issuance unit.

As one preferred feature, the first power source voltage is higher than the first operable voltage.

As another preferred feature, the voltage converting unit supplies the first operable voltage to the write request issuing unit even when the first power voltage is lowered.

As yet another preferred feature, the voltage monitoring unit outputs the issuance restrain signal when the first power source voltage keeps lower than the reference voltage for a predetermined time.

As a further preferred feature, the information processing apparatus further comprises a reset control unit which evaluates whether or not the write request issuing unit has halted issuance of the write request when the voltage monitoring unit outputs the issuance restrain signal, the reset control unit resetting the write request issuing unit when deciding that the write request issuing unit has halted issuance of the write request. At that time, the reset control unit evaluates whether or not the write request issuing unit has halted issuance of the write request, on the basis of an address effective signal which indicates whether or not an address contained in the write request issued from the write request issuing unit is effective.

As another preferred feature, the information processing apparatus further comprises a write control unit which controls data writing to the memory unit in accordance with the write request from the write request issuing unit, and the reset control unit resets the write request issuing unit and the write control unit when the reset control unit decides that the write issuing unit has halted issuance of the write request.

As yet another preferred feature, the memory unit holds data with a second power source voltage.

In order to accomplish the above object, as a generic feature, there is provided a memory unit erroneous write preventing method, which prevents erroneous data write to a memory unit of the information processing apparatus which has the memory unit to which data is written for each write request and a write request issuing unit which issues the write request, the method comprising: a voltage converting step for converting a power source voltage into a first operable voltage with which the write request issuing unit is operable, and supplies the first operable voltage to the write request issuing unit; a voltage monitoring step for outputting an issuance restraining signal which restrains issuance of a write request from the write request issuing unit, when the power source voltage becomes lower than the reference voltage which is higher than the first operable voltage; an issuance restrain controlling step for restraining the issuance of the write request by the write request issuance unit after completion of writing for each of the write requests to the memory unit when the issuance restrain signal output at the voltage monitoring step is received.

As a generic feature, there is provided an information processing system, comprising: a memory unit to which data is written for each write request; a write request issuing unit which issues the write request; a power supplying unit which supplies a power source voltage; a voltage converting unit which converts a power source voltage supplied from the power source supplying unit into an operable voltage with which the write request issuing unit is operable, and supplies the operable voltage to the write request issuing unit; a voltage monitoring unit to which a reference voltage higher than the operable voltage is input, when the power source voltage becomes lower than the reference voltage, for outputting an issuance restraining signal which restrains issuance of a write request from the write request issuing unit; and an issuance restrain controlling unit which receives the issuance restrain signal output from the voltage monitoring unit, and then after completion of writing for each of the write request to the memory unit, which restrains the issuance of the write request by the write request issuance unit.

The information processing apparatus, the memory unit erroneous write preventing method, and an information processing system of the present invention guarantee the following advantageous results.

According to the present invention, when the first power source voltage becomes not higher than a reference voltage which is higher than an operable voltage of the write request issuing unit, the voltage monitoring unit outputs an issuance restrain signal that restrains issuance of a write request (voltage monitoring step). When the issuance restrain controlling unit receives the issuance retrain signal, the issuance restrain controlling unit restrains issuance of a write request by the write request issuing unit after completion of writing to the memory unit for each write request from the write request issuing unit (issuance restrain controlling step). Hence, different from in the above described previous art, reset processing performed halfway through write processing to the memory unit, casing an occurrence of erroneous writing to the memory unit, is prevented, and it is possible to halt issuance of a write request by the write request issuing unit and reliably halt the write processing to the memory unit.

Accordingly, when the information processing apparatus is rebooted after resetting, if the information processing apparatus is activated with reference to the contents of the memory unit, the information processing apparatus is normally activated since erroneous writing is not performed in the memory unit.

Further, the first power source voltage is higher than an operable voltage of the write request issuing unit. Thus, even if the first power source voltage is lowered, voltage supply to the write request issuing unit by the voltage converting unit does not halt immediately.

Further, the voltage converting unit supplies an operable voltage to a part, even if the first power source voltage is lowered. Thus, even if the first power source voltage is lowered, the write request issuing unit is capable of reliably performing processing until the issuance retrain control unit restrains issuance of a write request.

Furthermore, since the voltage monitoring unit outputs an issuance retrain signal when the first power source voltage keeps being lower than a reference voltage for predetermined time, it is possible to output an issuance restrain signal after reliably detecting that a power source voltage becomes not higher than a reference voltage.

In this instance, a reset controlling unit is provided. When the voltage monitoring unit outputs an issuance retrain signal, the reset controlling unit evaluates whether or not the write request issuing unit has halted a write request. When decided that the write request issuing unit has halted issuance of a write request, the reset controlling unit resets the write request issuance unit. Thus, when a power source voltage is lowered, it is possible to reliably reset the write request issuing unit while restraining erroneous write to the memory unit.

Further, since the reset controlling unit evaluates whether or not the write request issuing unit has halted issuance of a write request based on an address effective signal, it is possible for the reset controlling unit to reliably evaluate whether or not the write request issuing unit has halted issuance of a write request.

Furthermore, since the reset controlling unit resets the controlling unit, it is possible to more reliably restrain erroneous writing to the memory unit.

In this instance, the memory unit holds data with the second power source voltage. Thus, even if supply of the first power source voltage is halted, the memory unit is capable of normally holding data in a state that erroneous writing is not done.

Other objects and further features of the present invention will be apparent from the following detailed description when read in conjunction with the accompanying drawings.

BRIEF DESCRIPTION OF THE DRAWINGS

FIG. 3(a) and FIG. 3(b) are diagrams for describing an operation of an information processing apparatus of the information processing system according to one preferred embodiment of the present invention when a power source voltage is lowered. FIG. 3 (a) is a diagram showing lowering of a power source voltage.

FIG. 7(a) and FIG. 7(b) are diagrams for describing an operation of the previous information processing apparatus when a power source voltage is lowered. FIG. 7 (b) is a timing chart for describing an operation of the information processing apparatus when the power source voltage is lowered.

DESCRIPTION OF THE PREFERRED EMBODIMENT(S)

Referring to the drawings, a description will be made herein after of one preferred embodiment of the present invention.

[1] Description of One Embodiment

Figure 1:
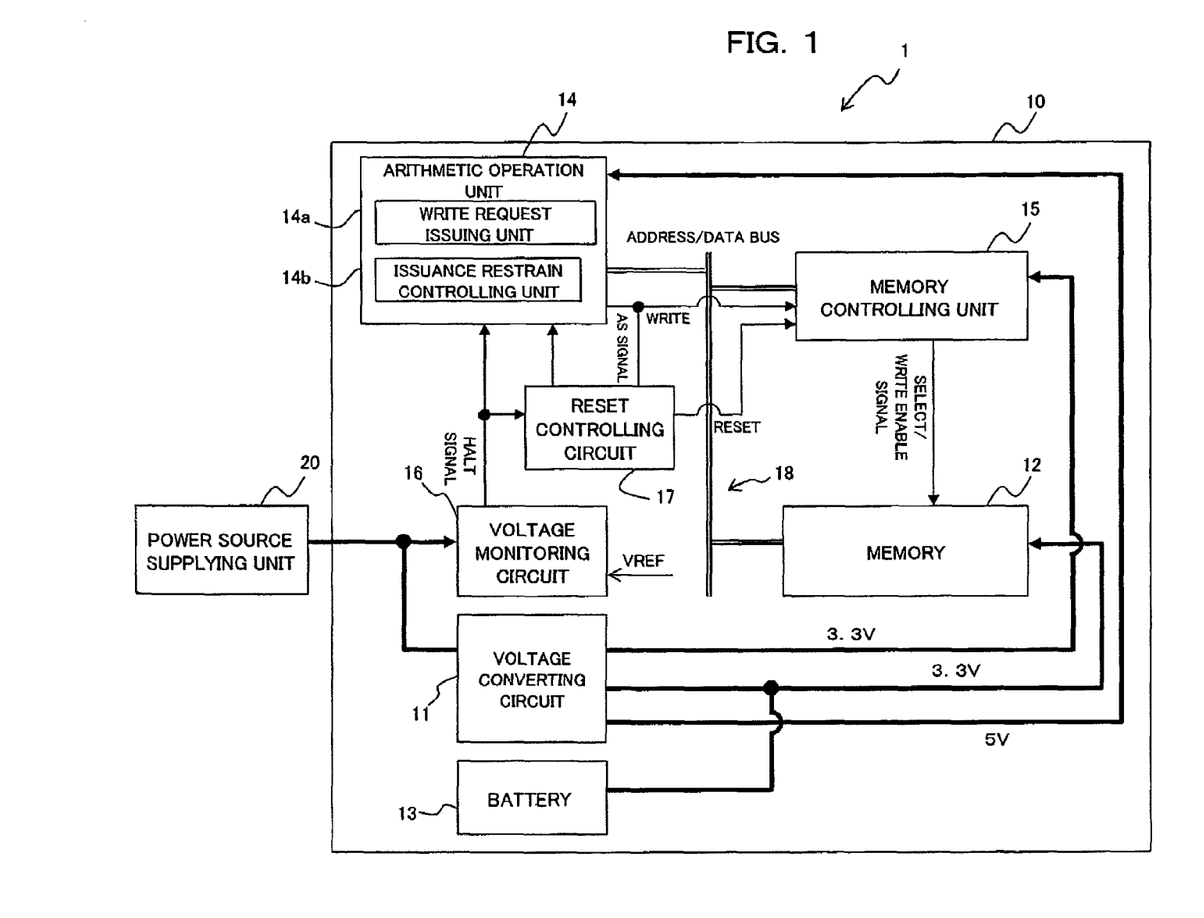
FIG. 1 is a block diagram showing a construction of an information processing system according to one preferred embodiment of the present invention.

First of all, referring to block diagram of FIG. 1, a description will be made of a construction of an information processing system according to one preferred embodiment of the present invention. As shown in FIG. 1, the information processing system 1 includes: an information processing apparatus 10; and a power source supplying unit 20 which performs power supply to the information processing apparatus 10.

The information processing apparatus 10 operated with a power source voltage supplied from the power source supplying unit 20. The information processing apparatus 10 includes: a voltage converting circuit (voltage converting unit) 11; a memory (memory unit) 12; a battery 13; an arithmetic operation unit (for example CPU) 14; a memory controlling unit (write controlling unit) 15; a voltage monitoring circuit (voltage monitoring unit) 16; and a reset controlling circuit (reset controlling unit) 17.

The voltage converting circuit 11 converts a power source voltage supplied from the power source supplying unit 20 (here, 12V: herein after simply called "power source voltage") supplied from the power source supplying unit 20 into a voltage to be used inside the information processing apparatus 10. The voltage converting circuit 11 converts the power source voltage into an operable voltage (the first operable voltage) with which the arithmetic operation unit 14 is operable and supplies the converted voltage to the arithmetic operation unit 14. In addition, the voltage converting circuit 11 converts the power source voltage into an operable voltage (the third operable voltage) for the memory 12, which voltage is lower than the operable voltage of the arithmetic operation unit 14, and supplies the converted voltage to the memory 12. Additionally, the voltage converting circuit 11 converts the power source voltage into an operable voltage (the second operable voltage) for the memory controlling unit 15, which voltage is lower than the operable voltage for the arithmetic operation unit 14, and supplies the converted voltage to the memory controlling unit 15.

Here, the arithmetic operation unit 14 is operable in a voltage band of 4.5 V through 5.5 V. The memory 12 is operable (data read/write) in a voltage band of 3.0 V through 3.6 V, and only data holding is available in a voltage band of 2.2 V through 3.6 V. The memory controlling unit 15 is operable, for example, in a voltage band of 3.0 V through 3.6 V.

Accordingly, the voltage converting circuit 11, in the present embodiment, converts (lowers) a power source voltage of 12V into a voltage of 5.0 V, for example, as an operable voltage of the arithmetic operation unit 14, and additionally converts (lowers) a power source voltage of 12V into 3.3 V as operable voltages for the memory 12 and the memory controlling unit 15, and supplies the converted voltages to the memory 12 and the memory controlling unit 15. In this instance, the voltage converting circuit 11 supplies voltage to the battery 13 to charge the battery 13.

Further, even when the power source voltage is lowered due to power failure or the like, the voltage converting circuit 11 converts the lowered power source voltage into operable voltages for the memory 12, the battery 13, the arithmetic operation unit 14, and the memory controlling unit 15, and supplies the converted voltages to the above elements.

That is, when a power source voltage higher than the operable voltage is input, the voltage converting circuit 11 can lower the power source voltage into operable voltages regardless of the value of the power source voltage.

Then, the power source voltage supplied from the power source supplying unit 20 is higher than an operable voltage of the arithmetic operation unit 14 whose operable voltage is the highest in the information processing apparatus 10. Hereby, even if the power source voltage is lowered due to power failure or the like, the voltage converting circuit 11 can supply operable voltages to the memory 12, the battery 13, the arithmetic operation unit 14, and the memory controlling unit 15, since the power source voltage is being higher than the operable voltage of the arithmetic operation unit 14.

To the memory 12 data for each write request issued from the arithmetic operation unit 14 is written. The memory 12 operates with a voltage supplied from the voltage converting circuit 11. In addition, when power source supply from the voltage converting circuit 11 is halted, it works as a memory unit [for example, RAM (Random Access Memory)] which can perform battery back up for holding data with a power source voltage (second power voltage) from the battery 13.

That is, though the memory 12 is volatile itself, it is constructed as a nonvolatile memory which keeps holding data with voltage from the battery 13.

The battery 13 is charged by electric power with a voltage from the voltage converting circuit 11 during a normal operation of the information processing apparatus 10.

The arithmetic operation unit 14 writes data to a memory 12, and has a write request issuing unit 14a which issues a data write request to the memory 12, and an issuance restrain controlling unit 14b which receives a HALT signal (issuance retrain signal) output from the voltage monitoring circuit 16, then after completion of write for each write request to the memory 12, halts issuance of a write request by the write request issuance unit 14a.

In other words, the arithmetic operation unit 14 functions as the write request issuance unit 14a and the issuance restrain controlling unit 14b.

In this instance, the detail will be described with reference to FIG. 3(*a*), FIG. 3(*b*), and FIG. 4 below. The arithmetic operation unit 14 does not restrain issuance of a write request of the write request issuance unit 14a immediately after reception of a halt signal. To halt issuance of a write request at a boundary of a bus cycle, issuance of a write request of the write request issuance unit 14a is restrained after writing for each write request is completed, that is, after completion of a unit of write processing relating to the write request.

The memory controlling unit 15 controls (permits) data writing to the memory 12 in response to a write request issued from the write request issuance unit 14a of the arithmetic operation unit 14.

In this instance, the information processing apparatus 10 can have multiple memory units (not illustrated) in addition to the memory 12. Further, other memory units (not illustrated) can be connected to the information processing apparatus 10. In that case, the memory controlling unit 15 performs access control to each memory unit and memory apparatus.

As shown in FIG. 1, the memory 12, the arithmetic operation unit 14, and the memory controlling unit 15 are connected through an address/data bus 18. When the memory controlling unit 15 permits data writing to the memory 12, in response to a write request (in the drawing, described "write") from the arithmetic operation unit 14, the memory controlling unit 15 sends a chip select signal for selecting the memory 12 and a write enable signal (in the drawing, described "select/write enable signal") to the memory 12. Hereby, the situation in which data writing to the memory 12 is realized, and data writing is performed to the memory 12 via the address/data bus 18.

The voltage monitoring circuit 16 monitors a power source voltage supplied from the power source supplying unit 20. To the voltage monitoring circuit 16, a reference voltage (see "VREF" in FIG. 2; here, 9.6 V) as a threshold value is input. For example, a comparator (not illustrated) compares the power source voltage and the reference voltage, thereby monitoring change in the power source voltage, here, lowering of the power source voltage shown in FIG. 2. When the power source voltage keeps being lower than the reference voltage (or not higher than the reference voltage) for a predetermined time successively, the voltage monitoring circuit 16 issues a halt signal which restrains issuance of a write signal issued from the write request issuance unit 14a to the issuance restrain controlling unit 14b and the reset controlling circuit 17.

Figure 2:
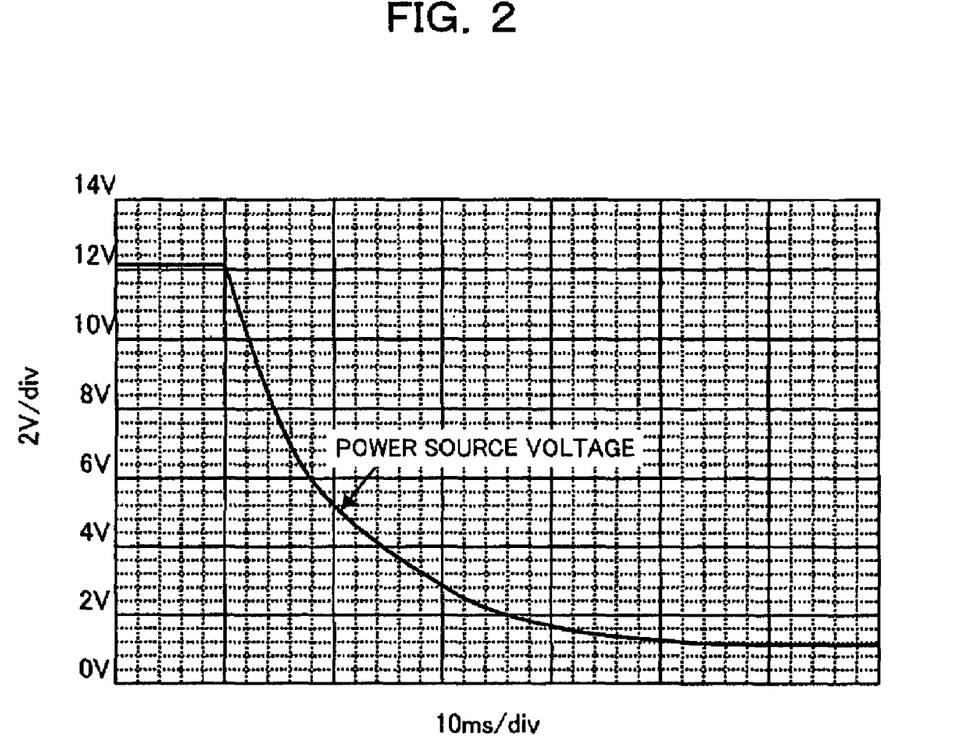
FIG. 2 is a diagram showing an example of lowering of a power source voltage supplied from a power source supplying unit of the information processing system according to one preferred embodiment of the present invention.

In this instance, lowering of the power source voltage occurs when a circuit breaker is off or when power failure occurs. As shown in FIG. 2, the power source voltage is normally lowered about 1 V per several ten meters.

In addition, the reference voltage is set higher than an operable voltage of the arithmetic operation unit 14.

The reset controlling circuit 17 resets the arithmetic operation unit 14 and memory controlling unit 15. Here, "reset" means, for example, to delete the data which is being under arithmetic operation and halfway through the processing and held by the memory controlling unit 15, and to halt the arithmetic operation unit 14 and the memory controlling unit 15.

The reset controlling circuit 17 receives a halt signal output by the voltage monitoring circuit 16, and then evaluates whether or not the write request issuance unit 14*a* has halted issuance of a write request, based on an address strove signal (address effective signal: in the drawing, described as "AS signal"), which indicates whether or not an address contained in a write request is effective. When deciding that the write request issuance unit 14*a* has halted issuance of a write request, the reset controlling circuit 17 resets the write request issuance unit 14*a* (here, the whole of the arithmetic operation unit 14) and the memory controlling unit 15.

More specifically, when an address strove signal contained in a write request indicates that in an address strove signal, an address is ineffective for a predetermined time successively, the reset controlling circuit 17 decides that the write request issuance unit 14*a* has halted issuance of a write request, and resets the arithmetic operation unit 14 and memory controlling unit 15.

Next, referring to the flowchart (step S1 through step S7) of FIG. 3(*a*), FIG. 3(*b*), and FIG. 4, a description will be made of an operation procedure (an operation procedure at the time of power source voltage lowering in the information processing apparatus 10) of a memory unit erroneous preventing method according to one preferred embodiment of the present invention.

Figure 3A:
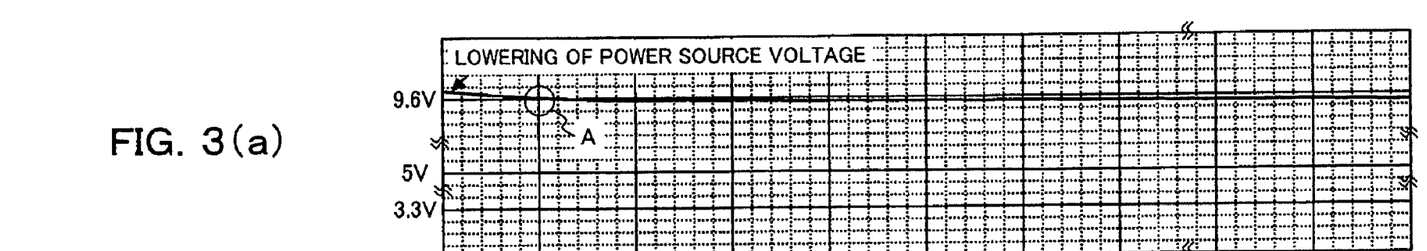
Figure 3B:
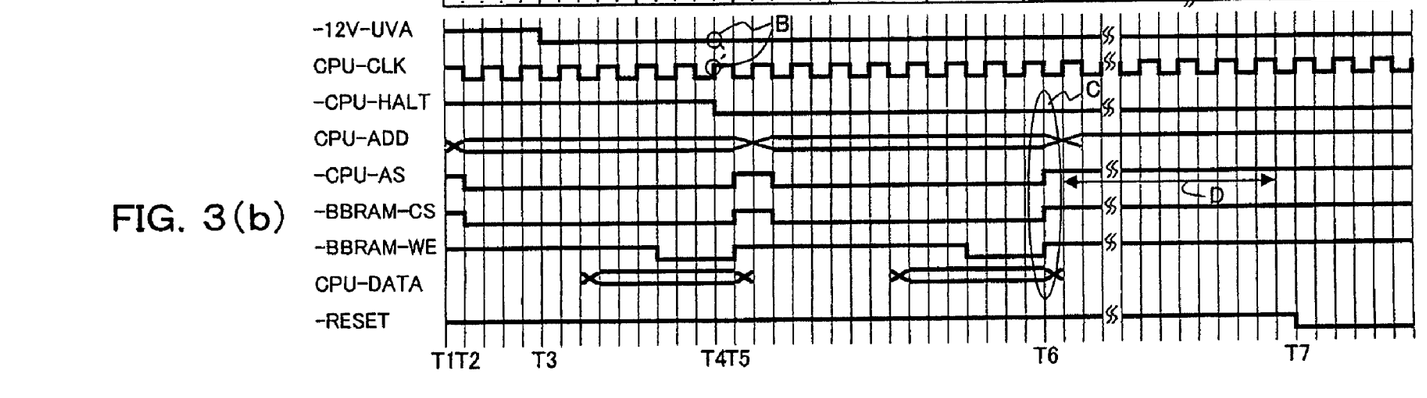
FIG. 3(b) is a timing chart for describing an operation of the information processing apparatus when the power source voltage shown in FIG. 3(a)

In this instance, FIG. 3(*a*) is a diagram showing a case where a power source voltage from the power source supplying unit 20 becomes not higher than the reference voltage (here, 9.6 V). FIG. 3(*b*) is a timing chart for describing an operation of the information processing system 1 (information processing apparatus 10).

In FIG. 3(*b*), "12V-UVA (Under Voltage Alarm)" indicates an alarm signal which is ON (assert) when the power source voltage becomes lower than the reference voltage. This alarm signal is a signal which is output from a comparator (not illustrated) that compares the power source voltage of the voltage monitoring circuit 16 and the reference voltage. "CPU-CLK" indicates a clock signal (for example, 25 MHz) input to the arithmetic operation unit 14, and "CPU-ADD" indicates an address in the memory 12 on the address bus 18 to which data is to be written, and "CPU-AS" indicates an address strove signal which indicates whether or not the address on the address bus 18 is effective. "-BBRAM-CS" indicates a chip select signal output from the memory controlling unit 15 to the memory 12, and "-BBRAM-WE" indicates a write enable signal output from the memory controlling unit 15 to the memory 12, and "CPU-DATA" indicates data to be written to the memory 12 on the data bus 18.

In this instance, in an alarm signal ("-12V-UVA"), a reset signal ("-RESET"), an address strove signal ("-CPU-AS"), a chip select signal ("-BBRAM-CS") and a write enable signal ("-BBRAM-WE") in FIG. 3(*b*), the lower side indicates ON (assert), and the upper side indicates OFF (negate).

First of all, the power source supplying unit 20 supplies a power source voltage higher than the operable voltage of the arithmetic operation unit 14 (power source voltage supplying step; see step S1 of FIG. 4), and the power source voltage from the power source supplying unit 20 is converted by the voltage converting circuit 11 to an operable voltage for the arithmetic operation unit 14 (here, 5.0 V), and supplies the voltage to the arithmetic operation unit 14. As to the memory 12 and the memory controlling unit 15, the power source voltage is converted into operable voltages (here, 3.3V), and supplied (voltage converting step; see step S2 of FIG. 4).

In this instance, even if a power source voltage from the power source supplying unit 20 is lowered (see FIG. 3(*a*)), the voltage converting circuit 11 converts a power source voltage into an operable voltage and supplies the voltage to the memory 12, the arithmetic operation unit 14, and the memory controlling unit 15 (see timing T1 through T7 of FIG. 3(*b*), until the arithmetic operation unit 14 and the memory controlling unit 15 receives a reset signal from the reset controlling circuit 17.

Figure 4:
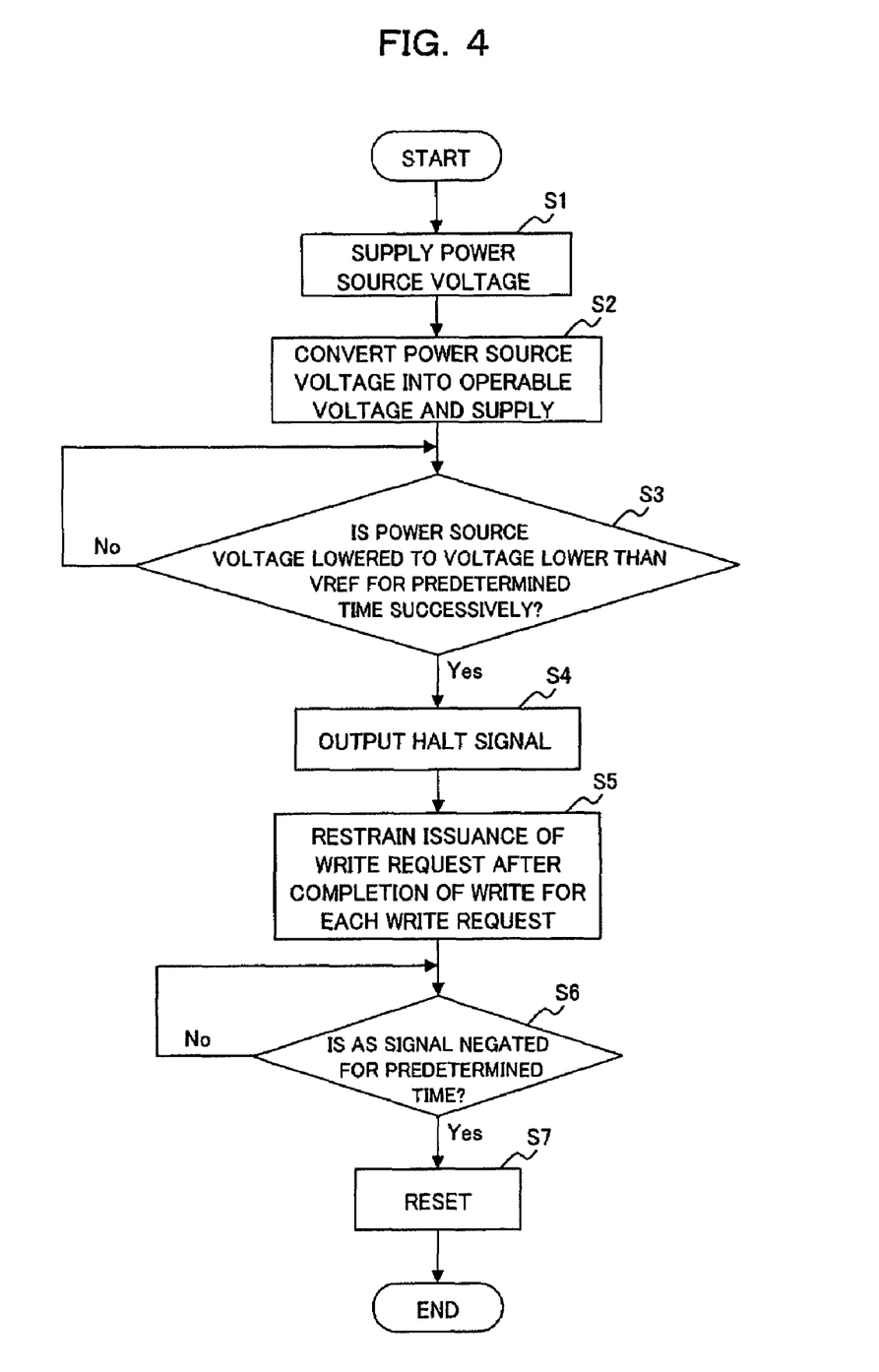
FIG. 4 is a flowchart for describing an operation procedure of a memory unit erroneous write preventing method according to one preferred embodiment of the present invention.

Then, a power source voltage becomes lower than a reference voltage [see range A indicated by middle broken line of FIG. 3(*b*)], an alarm signal is asserted inside the voltage monitoring circuit 16 [see timing T3 of FIG. 3(*b*)], and the voltage monitoring circuit 16 evaluates whether or not the power source voltage has kept being lower than the reference voltage for predetermined time successively (see step S3 of FIG. 4).

Here, when the power source voltage is not higher than the reference voltage ("Yes" route of step S3 of FIG. 4) while a clock signal rises 5 times, the voltage monitoring circuit 16 detects that an alarm signal becomes ON at the fifth rising clock after an alarm signal is asserted [see range B indicated by the middle broken line of FIG. 3(*b*)], and asserts (output to the issuance restrain controlling unit 14*b* and the reset controlling circuit 17 [see timing T4 of FIG. 3(*b*) and step S4 of FIG. 4] a halt signal.

In this manner, when the power source voltage keeps lower than the reference voltage for a predetermined time successively, the step S3 and S4 in FIG. 4 function as a voltage monitoring step which outputs a halt signal that restrains issuance of a write request from the write request issuance unit 14*a*.

In this instance, if the power source voltage does not keep being lower than the reference voltage for a predetermined voltage ("No" route of step S3 of FIG. 4), the voltage monitoring circuit 16 does not proceed to the processing of the above step S4.

In addition, since the voltage monitoring circuit 16 does not assert a halt signal immediately after the power source voltage is lowered to the reference voltage, but asserts a halt signal after the power source voltage keeps being lower than the reference voltage successively for a predetermined time (here, rising 5 clocks of the clock signals), noise of an alarm signal can be absorbed. That is, when the power source voltage repeats being high and low, exceeding and lowering the reference voltage, thereby causing fluttering of ON and OFF of the alarm signal, a halt signal is not output. Only when the power source voltage is surely lowered to a voltage lower than the reference voltage, the voltage monitoring circuit 16 is capable of outputting a halt signal.

Then, when the issuance restrain controlling unit 14*b* of the arithmetic operation unit 14 receives a halt signal, the issuance restrain controlling unit 14*b* normally halts a bus operation at the boundary of a bus cycle [see range C and timing T6 indicated by the middle broken line in FIG. 3(*b*)].

In this instance, the "bus cycle" means a unit of write processing for each write request issued from the arithmetic operation unit 14. It means one duration during which an address strove signal and a chip select signal are successively ON during timing T2 through T5 indicated in FIG. 3(*b*).

The issuance restrain controlling unit 14*b* does not restrain issuance of a write request of the write request issuance unit 14a immediately after reception of a halt signal. For example, to latch this halt signal and to halt issuance of a write request at the boundary of the bus cycle, the issuance restrain controlling unit 14b restrains issuance of a write request of the write request issuance unit 14a when writing for each write request is completed, that is, when one unit of write processing relating to the write request is ended [see range C indicated by the middle broken line and timing T6 in FIG. 3(b), and step S5 (issuance restrain controlling step) of FIG. 4].

Here, when the reset controlling circuit 17 receives a halt signal from the voltage monitoring circuit 16, it monitors an address strove signal contained in a write request output from the write request issuance unit 14a, in parallel with processing by the issuance restrain controlling unit 14b, independently from processing the issuance restrain controlling unit 14b, and evaluates whether or not an address strove signal indicates that an address contained in a write request is ineffective [that is, becomes negate ("High" in FIG. 3(b)) for a predetermined time (here, 2 [μs]) (see step S6 of FIG. 4).

Then, if the address strove signal indicates that an address is ineffective for a predetermined time successively [see both arrow D of FIG. 3(b) and "Yes" route of the step S6 of FIG. 4], the reset controlling circuit 17 asserts a reset signal to the write request issuance unit 14a (here, the arithmetic operation unit 14) and the memory controlling unit 15, and resets the write request issuance unit 14a and the memory controlling unit 15 (see timing T7 of FIG. 3(b) and step S7 of FIG. 4), and ends the procedure.

That is, when an address strove signal keeps negate for a predetermined time successively, the reset controlling circuit 17 decides that the issuance restrain controlling unit 14b has halted issuance of a write request, and resets the arithmetic operation unit 14 and the memory controlling unit 15.

In this manner, when an issuance restrain signal is output, the above steps S6 and S7 in FIG. 4 evaluate whether or not the write request issuance unit 14a has halted issuance of a write request. When deciding that the write request issuance unit 14a has halted issuance of a write request, the steps S6 and S7 function as a reset control step which resets the write request issuance unit 14a and the memory controlling unit 15.

In this instance, if an address strove signal does not become negate for a predetermined time successively ("No" route of the step S6 of FIG. 4), the reset controlling circuit 17 does not perform reset processing of the above step S7.

Further, the reset controlling circuit 17 is set so that the above predetermined time (here, 2 [μs]) for confirming that an address strove signal is negate is set longer than the maximum access time to the memory 12, and if another memory is provided other than the memory 12, the above predetermined time is set to the maximum access time to all the memories or a longer time than a bus cycle. Hereby, the reset controlling circuit 17 is capable of detecting (deciding) that the write request issuance unit 14a has halted issuance of a write request, and a bus cycle has been halted.

Further, from when the power source voltage becomes lower than the reference voltage to when the arithmetic operation unit 14 and the memory controlling unit 15 are reset (timing T3 through T7 of FIG. 3(b), is completed, for example, within 3 [μs]. Thus, the power source voltage is set to a value sufficiently higher than an operable voltage of 5.0 V, and further, the reference voltage is set to a value of 9.6 V sufficiently higher than an operable voltage of 5.0 V. Hereby, before the power source becomes lower than a voltage of 5.0 V so that the voltage converting circuit 11 cannot supply the arithmetic operation unit 14 with a voltage of 5.0 V, the write request issuance unit 14a of the arithmetic operation unit 14 can be halted at the boundary of a bus cycle. Hence, a bus operation can be normally halted at the boundary of a bus cycle.

In this instance, as described above, it takes several tens of ms for the power source voltage to be lowered by 1 V. On the other hand, it takes not longer than several [μs] to reset the write request issuance unit 14a and the memory controlling unit 15 from when the power source voltage becomes lower than the reference voltage. Thus, it never occurs that the power source voltage becomes lower than the operable voltage of the arithmetic operation unit 14 before the reset controlling circuit 17 performs reset processing.

In other words, in order to avoid the power source voltage from becoming not higher than the operable voltage of the arithmetic operation unit 14 for several micro seconds from when the power source voltage becomes lower than the reference voltage to when reset processing is performed, the reference voltage is set to a voltage higher than the operable voltage.

In this manner, according to the information processing system 1 (information processing apparatus 10) and the memory unit erroneous write preventing method in accordance with one preferred embodiment of the present invention, when the power source voltage becomes not higher than the reference voltage, which is higher than the operable voltage of the write request issuance unit 14a, the voltage monitoring circuit 16 outputs a halt signal which restrains issuance of a write request by the write request issuance unit 14a (voltage monitoring step). In case of reception of the halt signal, the issuance restrain controlling unit 14b restrains issuance of a write request from the write request issuance unit 14a after completion of writing for each write request of the write request issuance unit 14a to the memory 12 (issuance restrain controlling step). Thus, while restraining the occurrence of erroneous writing to the memory 12 caused by reset processing halfway through write processing as described in the previous art, it is surely possible to halt write processing to the memory 12 by the arithmetic operation unit 14 (write request issuance unit 14a) and the memory controlling unit 15.

Accordingly, when rebooting the information processing apparatus 10 after resetting, even if the information processing apparatus 10 reboots referring to the contents of the memory 12, the information processing apparatus 10 is capable of normally rebooting, since erroneous writing is not done in the memory 12.

Further, even when the power source voltage is lowered, the voltage converting circuit 11 supplies the operable voltage to the arithmetic operation unit 14. Thus, even a power source voltage is lowered, the arithmetic operation unit 14 is surely capable of performing processing until being reset by the reset controlling circuit 17.

In addition, the voltage monitoring circuit 16 outputs a halt signal when a power source voltage keeps being not higher than a reference voltage for predetermined time successively. Thus, noise of an alarm signal due to fluttering of the power voltage near the reference voltage is absorbed, and it is surely possible to detect that the power source voltage becomes not higher than the reference voltage and to output a halt signal.

In this instance, when the voltage monitoring circuit 16 outputs a halt signal (when receiving a halt signal), the reset controlling circuit 17 evaluates whether or not the write request issuance unit 14a has halted issuance of a write request. When deciding that the write request issuance unit 14a has halted issuance of a write request, the reset controlling circuit 17 resets the write request issuance unit 14a (reset controlling step). Thus when the power source voltage is lowered, it is surely possible to reset the write request issuance unit 14a while restraining erroneous write to the memory unit.

In this instance, since the reset controlling circuit 17 evaluates whether or not the write request issuance unit 14a has halted issuance of a write request based on an address strove signal contained in the write request, it is surely possible to evaluate whether or not the write request issuance unit 14a has halted issuance of a write request.

More specifically, when the address strove signal indicates that the address of a write request is ineffective for predetermined time successively, it is decided that the write request issuance unit 14a has halted issuance of a write request, so that the reset controlling circuit 17 can reliably decides that the write request issuance unit 14a has halted issuance of a write request.

In this instance, such predetermined time is set to be longer than a bus cycle relating to a write request, the reset controlling circuit 17 is capable of deciding more reliably that the write request issuance unit 14a has halted issuance of a write request.

In addition, since the reset controlling circuit 17 resets the memory controlling unit 15, it is possible to more reliably restrain erroneous writing to the memory 12.

[2] Others

The present invention should by no means be limited to the above-illustrated embodiment, and various changes or modifications may be suggested without departing from the gist of the invention.

For example, in the above-described embodiment, the voltage converting circuit 11 lowers a power source voltage higher than an operable voltage, and the operable voltage is supplied to the arithmetic operation unit 14, etc. The present invention should by no means be limited to this. For example, the voltage converting circuit 11 lowers a power source voltage together with raising a power source voltage which is lower than an operable voltage. In this case, a reference voltage input to the voltage monitoring circuit 16 set to be higher than the minimum voltage which can be raised by the voltage converting circuit 11 to the operable voltage of the arithmetic operation unit 14. Hereby, effects and benefits similar to those of the above-described embodiment are realized.

Further, in the above described embodiment, when power source voltage supply from the power source supplying unit 20 is halted, or when the information processing apparatus 10 halts, the memory 12 holds data using a voltage (second power source voltage) from battery 13. The second power source voltage, which is used by the memory 12 to hold data, is not limited to a voltage from the battery 13. For example, the memory 12 can be supplied with power source (second power source voltage) from outside to hold data.

In this instance, in the above-described embodiment, the information processing apparatus 10 includes the arithmetic operation unit 14 and the memory controlling unit 15. The present invention should by no means be limited to this, and the information processing apparatus 10 does not have the memory controlling unit 15, and the arithmetic operation unit 14 can have a function as the memory controlling unit 15 which performs write control to the memory 12.

In addition, in the present invention, paths of address data and write data at write processing to the memory 12 should not be limited. The address data and write data can be sent directly to the memory 12 from the arithmetic operation unit 14 via the bus 18, and these data can be sent to the memory 12 via the memory controlling unit 15.

What is claimed is:

1. An information processing apparatus, comprising:
a write request issuing unit which issues a write request;
a memory unit to which data is written in response to the write request;
a voltage converting unit which converts a first power source voltage into a first operable voltage with which said write request issuing unit is operable, and supplies the first operable voltage to said write request issuing unit;
a voltage monitoring unit which receives a reference voltage higher than the first operable voltage, and, when the first power source voltage becomes lower than the reference voltage, outputs an issuance restraining signal; and
an issuance restrain controlling unit which, in response to receiving the issuance restraining signal output from said voltage monitoring unit, restrains said write request issuance unit from issuing any further write request after completion of the writing for the write request to said memory unit.

2. An information processing apparatus as set forth in claim 1, wherein the first power source voltage is higher than the first operable voltage.

3. An information processing apparatus as set forth in claim 1, wherein said voltage converting unit supplies the first operable voltage to said write request issuing unit even when the first power voltage is lowered.

4. An information processing apparatus as set forth in claim 1, wherein said voltage monitoring unit outputs the issuance restrain signal when said first power source voltage keeps lower than the reference voltage for a specified time.

5. An information processing apparatus as set forth in claim 1, further comprising a reset control unit which evaluates whether or not said write request issuing unit has halted issuance of the write request when said voltage monitoring unit outputs the issuance restrain signal, said reset control unit resetting said write request issuing unit when deciding that said write request issuing unit has halted issuance of the write request.

6. An information processing apparatus as set forth in claim 5, wherein said reset control unit evaluates whether or not said write request issuing unit has halted issuance of the write request, on the basis of an address effective signal which indicates whether or not an address contained in the write request issued from said write request issuing unit is effective.

7. An information processing apparatus as set forth in claim 6, wherein said reset control unit decides that said write request issuing unit has halted issuance of the write request when the address effective signal from said write request issuing unit indicates an address is ineffective for a specified time.

8. An information processing apparatus as set forth in claim 5, further comprising a write control unit which controls data writing to said memory unit in accordance with the write request from said write request issuing unit,
said reset control unit resetting said write request issuing unit and said write control unit when said reset control unit decides that said write issuing unit has halted issuance of the write request.

9. An information processing apparatus as set forth in claim 8, wherein said write control unit is operable with a second operable voltage which is lower than the first operable voltage of the write request issuing unit, and said voltage converting unit converts the first power source voltage into the second operable voltage, and supplies the second operable voltage to said write control unit.

10. An information processing apparatus as set forth in claim 1, wherein said memory unit holds data with a second power source voltage.

11. An information processing apparatus as set forth in claim 1, wherein said memory unit is operable with a third operable voltage which is lower than the first operable voltage of said write request issuing unit, and said voltage converting unit converts the first power source voltage into the third operable voltage and supplies the third operable voltage to the memory unit.

12. A memory unit erroneous write preventing method, which prevents erroneous data write to a memory unit of the information processing apparatus including a write request issuing unit which issues a write request and the memory unit to which data is written in response to the write request, said method comprising:
   converting a power source voltage into a first operable voltage with which the write request issuing unit is operable;
   supplying the first operable voltage to the write request issuing unit;
   outputting an issuance restraining signal which restrains issuance of a write request from the write request issuing unit, when the power source voltage becomes lower than the reference voltage which is higher than the first operable voltage;
   restraining, in response to receiving the issuance restraining signal output, an issuance of any further write request by the write request issuance unit after completion of the writing for the write request to the memory unit.

13. A memory unit erroneous write preventing method as set forth in claim 12, further comprising supplying a voltage higher than the operable voltage as the power source voltage.

14. A memory unit erroneous write preventing method as set forth in claim 12, wherein said converting includes supplying the first operable voltage to the write request issuing unit even when the power source voltage is lowered.

15. A memory unit erroneous write preventing method as set forth in claim 12, wherein said monitoring includes outputting the issuance restrain signal when the power source voltage keeps lower than the reference voltage for a specified time.

16. A memory unit erroneous write preventing method as set forth in claim 12, further comprising evaluating whether or not the write request issuing unit has halted issuance of the write request when the issuance restrain signal is output, and resetting the write request issuing unit when the write request issuing unit decides that the write request issuing unit has halted issuance of the write request.

17. A memory unit erroneous write preventing method as set forth in claim 16, wherein said controlling includes evaluating whether or not the write request issuing unit has halted issuance of the write request on the basis of an address effective signal which indicates whether or not an address contained in the write request issued from the write request issuing unit is effective.

18. A memory unit erroneous write preventing method as set forth in claim 17, wherein at said controlling includes deciding that the write request issuing unit has halted issuance of the write request when the address effective signal from the write request issuing unit indicates an address is ineffective for a specified time.

19. A memory unit erroneous write preventing method as set forth in claim 16, wherein the information processing apparatus further includes a write controlling unit which controls data writing to the memory unit in accordance with the write request from the write request issuing unit, and said controlling includes resetting the write request issuing unit and the write control unit when the reset control unit decides that the write issuing unit has halted issuance of the write request.

20. An information processing system, comprising:
   a write request issuing unit which issues a write request;
   a memory unit to which data is written in response to the write request;
   a power supplying unit which supplies a power source voltage;
   a voltage converting unit which converts said power source voltage supplied from said power source supplying unit into an operable voltage with which said write request issuing unit is operable, and supplies the operable voltage to said write request issuing unit;
   a voltage monitoring unit which receives a reference voltage higher than the operable voltage, and, when the power source voltage becomes lower than the reference voltage, outputs an issuance restraining signal; and
   an issuance restrain controlling unit which, in response to receiving the issuance restraining signal output from said voltage monitoring unit, restrains said write request issuance unit from issuing any further write request after completion of the writing for the write request to said memory unit.

21. An information processing apparatus as set forth in claim 1, wherein the issuance of the write request is halted at a boundary of a bus cycle.

* * * * *